(12) United States Patent
Sorano et al.

(10) Patent No.: US 12,544,118 B2
(45) Date of Patent: *Feb. 10, 2026

(54) CYLINDRICAL GRANULE MADE OF BIOCOMPATIBLE METAL MATERIAL FOR VERTEBROPLASTY

(71) Applicant: MT Ortho S.r.l., Aci Sant'Antonio (IT)

(72) Inventors: Gaetano Sorano, Trecastagni (IT); Roberto Drago, Viagrande (IT)

( * ) Notice: Subject to any disclaimer, the term of this patent is extended or adjusted under 35 U.S.C. 154(b) by 525 days.

This patent is subject to a terminal disclaimer.

(21) Appl. No.: 18/002,268

(22) PCT Filed: Jun. 11, 2021

(86) PCT No.: PCT/IB2021/055145
§ 371 (c)(1),
(2) Date: Dec. 18, 2022

(87) PCT Pub. No.: WO2021/260474
PCT Pub. Date: Dec. 30, 2021

(65) Prior Publication Data
US 2023/0210564 A1 Jul. 6, 2023

(30) Foreign Application Priority Data
Jun. 22, 2020 (IT) ................ 102020000014881

(51) Int. Cl.
*B22F 1/06* (2022.01)
*A61B 17/70* (2006.01)
*B22F 1/17* (2022.01)

(52) U.S. Cl.
CPC ............ *A61B 17/7095* (2013.01); *B22F 1/06* (2022.01); *B22F 1/17* (2022.01)

(58) Field of Classification Search
None
See application file for complete search history.

(56) References Cited

U.S. PATENT DOCUMENTS

| 10,478,522 | B2 * | 11/2019 | Francaviglia ........... A61L 27/56 |
| 12,226,132 | B2 * | 2/2025 | Sorano ................ A61F 2/30942 |
| 2005/0177238 | A1 | 8/2005 | Khandkar |
| 2007/0260313 | A1 | 11/2007 | Sidler |
| 2009/0036908 | A1 * | 2/2009 | Zokol ..................... A61B 17/60 |
| | | | 606/151 |

(Continued)

FOREIGN PATENT DOCUMENTS

| CN | 201200499 | | 3/2009 |
| CN | 105493203 A | * | 9/2016 |

(Continued)

OTHER PUBLICATIONS

English translation of CN 105493203 (originally published Sep. 21, 2016), obtained from PE2E search.*

*Primary Examiner* — George Wyszomierski
(74) *Attorney, Agent, or Firm* — Themis Law

(57) ABSTRACT

A cylindrical granule made of a biocompatible metal material, in particular titanium or its alloys, for vertebroplasty operations has a cylindrical shape and includes a central cylindrical body connected at its ends to a first disc and to a second disc respectively, and a portion with a trabeculated structure, which extends around the central cylindrical body between the lower surface of the first disc and the upper surface of the second disc.

9 Claims, 3 Drawing Sheets

(56) References Cited

U.S. PATENT DOCUMENTS

2016/0158417 A1* 6/2016 Fonte .................. A61F 2/30767
                                                     623/23.57
2018/0021139 A1* 1/2018 Spivack ............... A61C 8/0012
                                                     606/331
2019/0099515 A1    4/2019 Bagga

FOREIGN PATENT DOCUMENTS

| EP | 1961433 | 8/2008 |
| EP | 2727559 | 5/2014 |
| EP | 3404747 | 11/2018 |

\* cited by examiner

CYLINDRICAL GRANULE MADE OF BIOCOMPATIBLE METAL MATERIAL FOR VERTEBROPLASTY

FIELD OF THE INVENTION

The present invention relates to a specific configuration, in particular cylindrical, of a granule made of biocompatible metal material such as titanium or its alloys, to be used in vertebroplasty or transcutaneous kyphoplasty.

Vertebroplasty, or kyphoplasty, treatment used in patients with vertebral compression fractures.

STATE OF THE ART

The present applicant is the holder of granted Italian patent nr. 0001425055, and pending European patent application EP3169375, claiming the priority of said Italian patent, which describe granules made of biocompatible material suitable for use in vertebroplasty operations, and also Italian patent application nr. 102019000003947 extended as international patent application PCT/IB2020/051969 relating to a specific configuration of a spherical metal granule.

All of these prior patents of the same Applicant therefore propose a prosthetic device made of biocompatible material, in particular titanium or its alloys, in the form of granules comprising at least an external surface portion having a porosity suitable for allowing osteointegration and promoting bone growth.

This solution offers an innovative alternative to systems known from the state of the art, which provided for the use of bone cement such as PMMA (polymethylmethacrylate).

The most widely-used technique provides for the use of a balloon: after preparing the necessary access route, the surgeon inserts the cannula into the collapsed vertebra which allows the balloon to be inserted inside the main body of the vertebra, in the area where the collapsed cancellous bone no longer fulfils its supporting function.

The cannula is inserted with transpedicular access directly into the main body of the vertebra, with the patient in a prone and distracted position.

The entire surgical phase takes place under fluoroscopy.

Once the correct position has been reached inside the main body of the vertebra, a bone compression device is inserted through the cannula, which is simply a balloon that is inflated by means of liquid or equivalent systems.

The balloon exerts the function of compacting the trabeculae of the cancellous bone of the main body of vertebra, while expanding the internal cavity of the collapsed vertebra.

Once the cavity of the vertebra has been expanded by means of the balloon, the latter is retracted and cement commonly used in orthopaedics, indicated PMMA as already (polymethylmethacrylate), is inserted into the cavity thus obtained, again by means of a cannula.

The use of cement in kyphoplasty has the advantage of immediately guaranteeing primary stability, i.e. a resistance to the compressive loads acting on the spine, which guarantees a very short hospital stay for the patient, so much so that the patient can be discharged within a few days after surgery.

The drawbacks affecting traditional techniques involving the use of bone cement have been overcome by the Applicant through the use of granules made of biocompatible material for vertebroplasty operations, according to the teachings of EP3169375.

Within these teachings, the present Applicant has developed the specific configuration of the granule made of biocompatible metal material, such as titanium or its alloys, for vertebroplasty, object of Italian patent application nr. 102019000003947 and international patent application PCT/IB2020/051969 in which the preferred spherical configuration is disclosed.

This patent application therefore falls within the state of the art outlined above, in which the same Applicant proposes spherical metal granules for vertebroplasty operations. Within this state of the art, the solution object of the present invention offers a new manufacturing variant of the granule object of Italian patent application nr. 102019000003947, which allows an improved insertion phase of the granules inside the compromised vertebra by means of a cannula, making it smoother, according to what can be seen more clearly further on.

SUMMARY OF THE INVENTION

The main undertaking of the present invention is to provide a granule made of biocompatible metal material, such as titanium or its alloys, which is optimized for use in vertebroplasty operations.

Within this undertaking, the objective of the present invention is therefore to provide a granule made of biocompatible metal material, such as titanium or its alloys, for vertebroplasty that provides optimal primary stability, i.e. an optimized resistance to the compressive loads acting on the spine, and which at the same time allows an optimized osteointegration and osteoinductive capacity.

A further objective of the present invention is to provide a granule made of biocompatible metal material for vertebroplasty that facilitates introduction operations into the damaged vertebra by means of a cannula, in particular the same cannula adopted by the surgeon for the insertion of the balloon used for compacting the trabecular of the cancellous bone of the main body of the vertebra, at the same time expanding the internal cavity of the collapsed vertebra, according to the traditional surgical technique.

A further objective of the present invention is to provide a cylindrical granule made of biocompatible metal material for vertebroplasty which, due to its geometry, has an elasticity as close as possible to the average elasticity of the reference bone of the vertebra to be restored and whose growth is to be stimulated and with which osseointegration is to be obtained.

These undertakings and these and other objectives according to the present invention are achieved by a granule made of biocompatible metal material for vertebroplasty according to the enclosed claim 1.

Further characteristics of the granule made of biocompatible metal material for vertebroplasty, according to the present invention, are the subject of the dependent claims.

LIST OF FIGURES

The characteristics and advantages of the biocompatible metal granule for vertebroplasty according to the present invention will be even more evident from the following detailed description, provided in an exemplary and non-limiting form, referring to the attached schematic drawings in which.

DETAILED DESCRIPTION OF THE INVENTION

Figure 1:
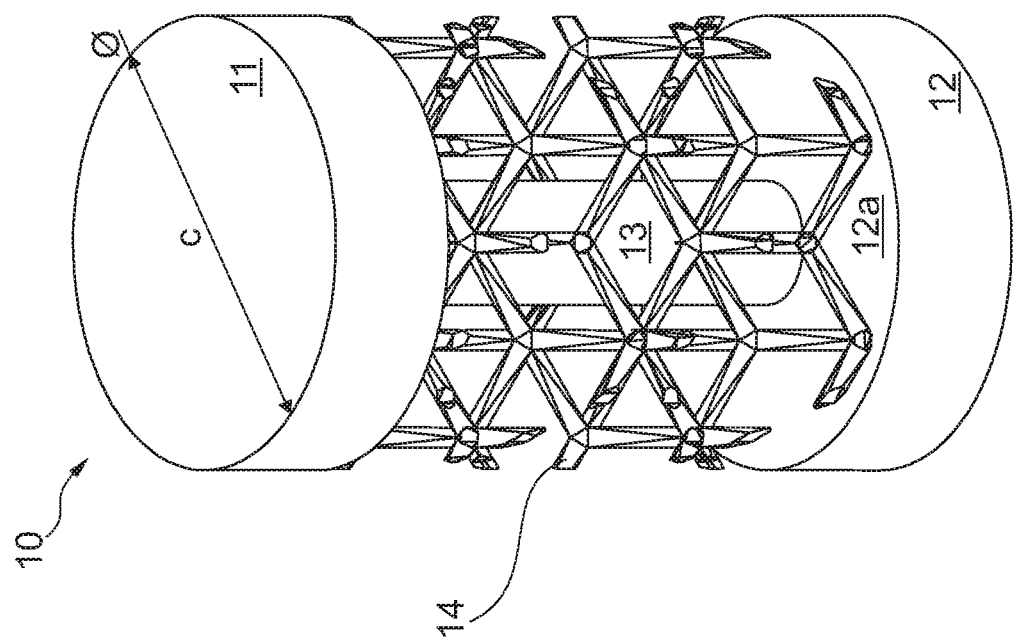
FIG. 1 shows an overall perspective view of the cylindrical granule made of biocompatible metal material according to the present invention.
Figure 2:
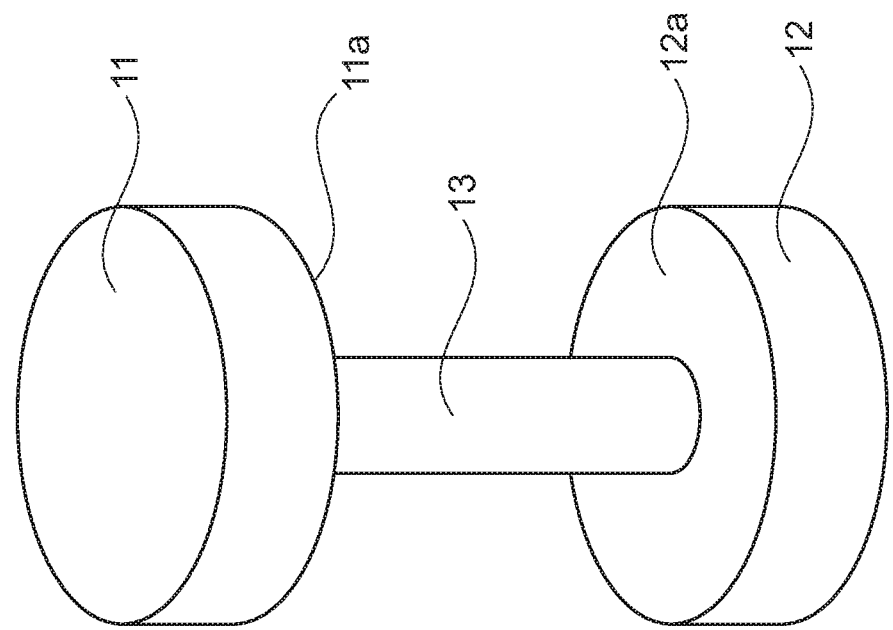
FIG. 2 shows a view of the full solid structure only of the granule of FIG. 1 from which the trabeculated portion has been removed.

The cylindrical granule according to the present invention is made of biocompatible metal material, more particularly in metal materials based on titanium and/or its alloys, and are produced with such characteristics as to simultaneously allow insertion during the operating phase inside the main body of the vertebra, resistance to primary loads, osteointegration of the granules over time and the stimulation of bone re-growth.

The specific cylindrical conformation of the granule 10 according to the present invention advantageously optimizes the insertion step of the granule into the vertebra to be repaired which can take place by means of a cannula, preferably the same cannula with which the surgeon inserts the balloon inside the main body of the vertebra.

This cannula has a reduced diameter, which therefore imposes the maximum diameter of the granules. At the same time, the granules must have such dimensions that once inserted inside the vertebra, they do not move and do not exit through any bone shortages that may occur in the walls of the body of the vertebra as a result of vertebral damage.

The granules 10 according to the present invention have a substantially cylindrical shape, and have a central cylindrical body 13 connected, at its ends, to a first disc 11 and to a second disc 12 respectively, said discs 11, 12 lying on a plane substantially orthogonal to the longitudinal axis of said central cylindrical body 13.

The external diameter C of the cylindrical granule 10, which coincides with the diameter of the discs 11 and 12, is preferably less than 4 mm, more preferably ranging from 3 to 4 mm, even more preferably 3.3 mm.

Said central cylindrical body 13 and said first disc 11 and second disc 12 have a solid structure made of a biocompatible metal material, preferably titanium or its alloys.

Figure 4:
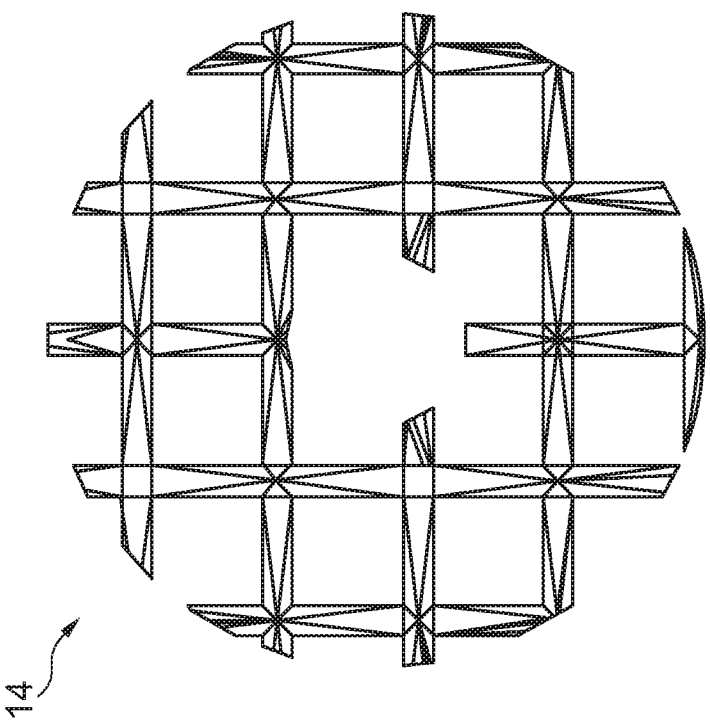
FIG. 4 shows a detail of the trabeculated portion of FIG. 3.
Figure 3:
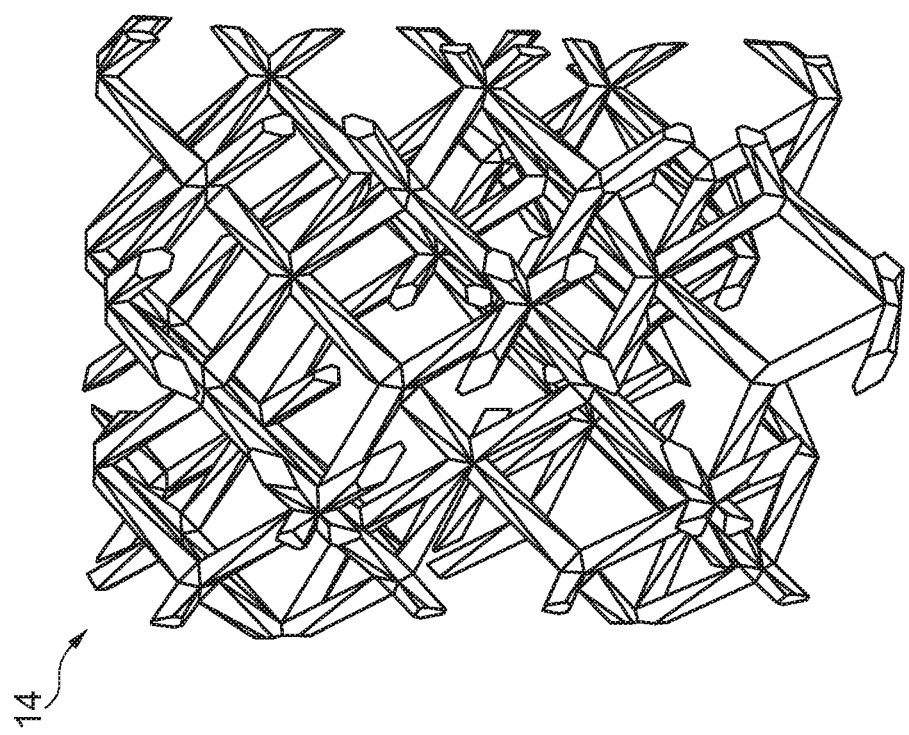
FIG. 3 shows an enlarged schematic representation of the trabeculated portion only of the granule of FIG. 1.

According to what can be seen by way of example in the attached figures, and in particular in the enlarged partial views of FIGS. 3 and 4, the cylindrical granule 10 according to the present invention comprises a portion having a trabeculated structure 14 which extends around said central cylindrical body 13 extending between the internal surface 11a of said first disc 11 and the external surface 12a of said second disc 12, around said central cylindrical body 13.

Said trabeculated portion 14 advantageously extends around said central cylindrical body 13 remaining within the cylindrical shape defined by the two end discs 11, 12 of the granule itself, according to what can be seen for example in FIG. 1.

The cylindrical granule 10 according to the present invention is advantageously produced by means of production techniques which provide for the localized casting of powders (metal or polymeric powders) by means of high-energy electron beams.

These techniques, known as EBM, acronym of Electron Beam Melting, are today extremely advanced manufacturing technologies that allow the creation of objects also having an extremely complex geometry and with different surface roughnesses starting from a computer drawing of the finished product, which is processed by computerized machines that guide the electron beam in its action.

Electron beam melting is a relatively new rapid prototyping technique for the production of implant structures, and allows the production of complex three-dimensional geometries.

Using this technique, the present Applicant has perfected the cylindrical granule 10 object of the present invention in which the part having a regular trabecular structure 14, with a pore size between one trabecula and the other in the order of a hundred microns.

More specifically, the regular trabecular structure 14 will have a pore diameter ranging from 400 to 800 microns, even more preferably the pore diameter will be about 600 microns, preferably 640 microns.

The trabecular structure 14 in titanium or titanium alloys, in particular, thanks to an elastic modulus very close to that of the natural trabecular bone, restores the physiological transfer of loads, avoiding damage to the bone and actually favouring its re-growth.

With respect to the specific configuration of the cylindrical granule 10 according to the present invention, the area having a trabeculated structure 14 which involves at least a portion of said granule 10 which extends around said central cylindrical body 13, between said first disc 11 and said second disc 11, will advantageously have a trabeculated structure created through the EBM production process that uses the known type of software element called "dode-thin".

Figure 5A:
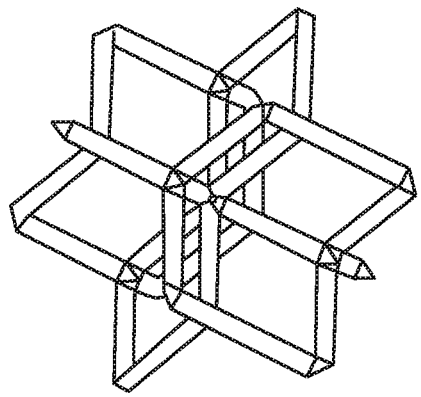
FIGS. 5A and 5B and FIGS. 6A and 6B show the dode-thin structure, of the known type, of the trabeculation of the cylindrical granule according to the present invention.
Figure 6A:
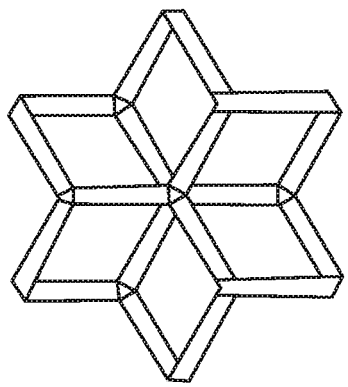
Figure 5B:
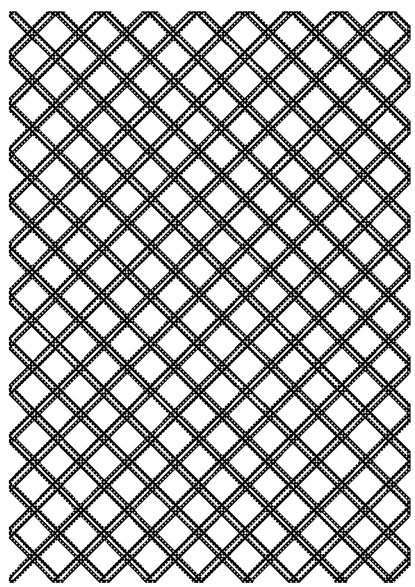
Figure 6B:
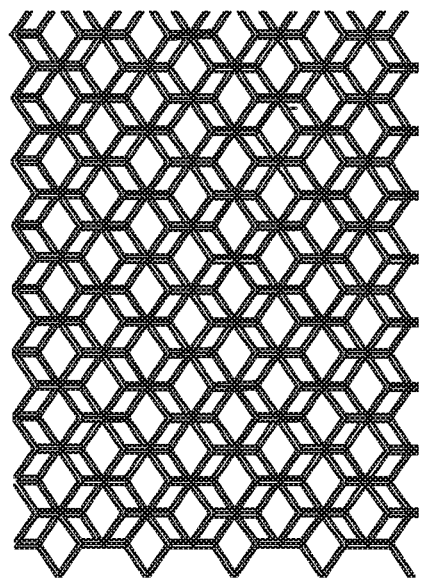

With particular reference to FIG. 3, this shows a portion of the trabeculated structure comprising a "dode-thin" mesh, whereas FIG. 5A shows the orientation of the "dode-thin" element corresponding to the hexahedral geometry shown in FIG. 5B, which there is in correspondence with the faces of the three-dimensional trabeculated structure, and FIG. 6A shows the orientation of the "dode-thin" element corresponding to the octahedral geometry shown in FIG. 6B which there is in correspondence with the diagonals (at 45°) of the three-dimensional trabeculated structure.

The CAD-CAM software implement the mesh according to the "dode-thin" elements, of a known type, starting from a drawing showing a level of detail as illustrated, for example, in FIGS. 3 and 4, finally arriving at a product, obtained through EBM techniques, as shown in FIG. 1.

The Applicant has also verified that the particular configuration of the cylindrical granule 10 according to the present invention, and in particular the presence of a central cylindrical body 13 having a full solid structure connected at its ends to a first disc 11 and to a second disc 11 also having a full solid structure, and of the wide trabeculated area 14 which extends around said central cylindrical body 13, allows an optimal mechanical behaviour to be obtained in the in-vivo implant for supporting loads, immediately obtaining the primary stability of the implant, both for the structure of the granules themselves and for the shape that allows an interlocking between adjacent granules.

Furthermore, as already mentioned, the cylindrical shape facilitates the insertion of the granules 10 into the vertebra through a surgical cannula, preferably the same cannula used by the surgeon for the insertion of the balloon into the body of the vertebra, thus avoiding having to extract and re insert the cannula in order to perform the two operations for inserting the balloon and the granules.

From the description provided so far, the features of the cylindrical granule made of biocompatible metal material, in particular titanium or its alloys, to be used in vertebroplasty operations according to the present invention are evident, as also the relative advantages.

It is understood that the cylindrical granule for vertebroplasty operations thus conceived can undergo modifications and/or variations, all falling within the invention whose protection scope is defined by the enclosed claims.

In particular, the materials described, as also the dimensions, may vary according to requirements.

The invention claimed is:

1. A cylindrical granule made of a biocompatible metallic material for vertebroplasty operations, the cylindrical granule having a cylindrical shape and
- a central cylindrical body, the central cylindrical body having an upper end connected to a first disk and a lower end connected to a second disk; and
- a portion with a trabeculated structure which extends around said central cylindrical body between a lower surface of said first disk and an upper surface of said second disk.

2. The cylindrical granule according to claim 1, wherein said central cylindrical body has a solid structure.

3. The cylindrical granule according to claim 1, wherein said first disk and said second disk have a solid structure.

4. The cylindrical granule according to claim 1, wherein an external diameter of said cylindrical granule, corresponding to a diameter of said first and said second discs, is less than 4 mm.

5. The cylindrical granule according to claim 4, wherein said external diameter of said cylindrical granule is comprised between 3 and 4 mm.

6. The cylindrical granule according to claim 4, wherein said external diameter of said cylindrical granule is equal to 3.3 mm.

7. The cylindrical granule according to claim 1, wherein said cylindrical granule is manufactured using electron beam melting (EBM) rapid prototyping.

8. The cylindrical granule according to claim 1, wherein said portion with a trabeculated structure has a porosity, in which an average pore size is between 400 and 800 microns.

9. The cylindrical granule according to claim 1, wherein said portion with a trabeculated structure has a trabeculation made by EBM, said trabeculated structure being formed by dode-thin elements.

* * * * *